Figure 1:
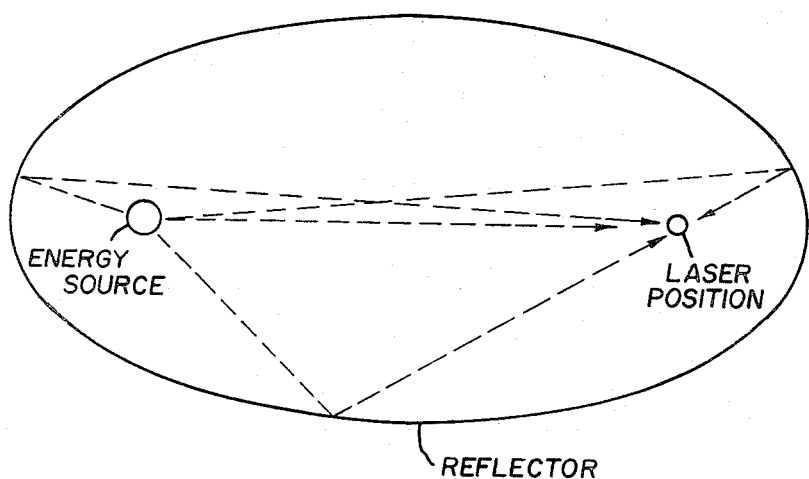

April 2, 1968 E. C. LETTER 3,376,418
MEASURING LASER OUTPUT ENERGY COMPRISING A LEAD
FLUOSILICATE GLASS DOSIMETER ELEMENT
Filed March 30, 1964

EUGENE C. LETTER
INVENTOR.

BY

ATTORNEY 3,376,418
MEASURING LASER OUTPUT ENERGY COMPRISING A LEAD FLUOSILICATE GLASS DOSIMETER ELEMENT
Eugene C. Letter, Penfield, N.Y., assignor to Bausch & Lomb Incorporated, Rochester, N.Y., a corporation of New York
Filed Mar. 30, 1964, Ser. No. 355,958
21 Claims. (Cl. 250—83)

This invention relates to a novel method and article for detecting and measuring electromagnetic radiation and more particularly to a method and article for indicating the output of flash lamps, lasers and the like.

The optical laser is a device from which potential radiant energy may be released. A radiant flux provides the excitation for the laser. The energy is retained within the crystal or glass until a controlling radiation releases the potential energy in a form of intense radiation. It is necessary for the operation of the laser that a source of radiation be provided with means for directing the radiation on the glass or crystal to build up the energy within the glass or crystal.

In the operation of lasers, it is desirable to measure the threshold level for stimulating emission. A measure of the threshold level is a measure of the minimum energy required to cause the laser to lase. This measure provides information showing the different energy level requirements for causing given materials or rods to emit useful radiation. In other cases, it is desirable to measure the input of energy into a laser so that similar outputs are reproducible to obtain uniformity between operations.

The novel dosimeters and methods disclosed herein are applicable for measuring the threshold levels, as well as the energy input and energy output in laser operations. In measuring such information the methods and articles disclosed and claimed herein overcome the need for the complex fiber optic and electronic systems previously utilized in attempting to obtain such information. Additionally, the methods and devices according to the present invention may be utilized to measure the output of photographic flash lamps as well as a means for measuring relatively low energy outputs. Examples of low energy outputs which may be measured by the method and devices according to the present invention are cathode ray tubes such as television picture tubes, tungsten filaments, irradiation patterns and others.

In addition to having the aforementioned applications and advantages, the methods and articles according to the present invention are relatively inexpensive. Furthermore, the articles may be produced with dimensions which are identical to a laser rod to thereby minimize or remove any geometric consideration in determining the energy input.

Briefly, the method according to the present invention includes the step of providing a body having fluoride and reducible lead ions therein. The body is subjected to irradiation by X-rays or gamma rays to thereby change the physical characteristics of the body. The colored body is exposed to a flux of electromagnetic radiation such as light whereby the change in absorption or transmission produced by the exposure is an indication of the intensity of the flux.

Figure 2:
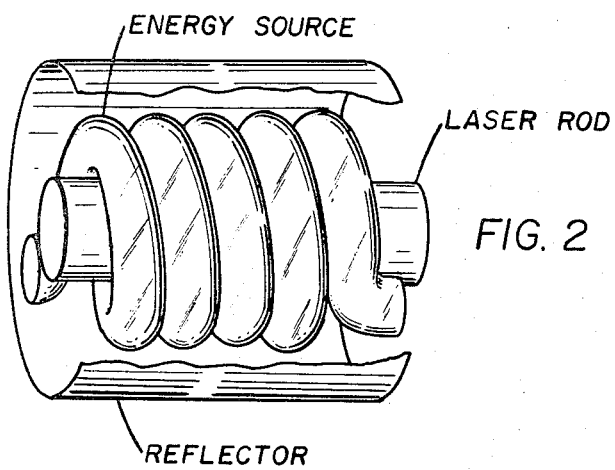

The objects and advantages of the invention will be understood from the drawing wherein:

FIG. 1 is a schematic representation of a typical laser energizing system have a reflective housing, energy source and laser position, and FIG. 2 is a perspective view of a similar system having a helical energy source and cylindrical housing.

The dosimeter according to the present invention comprises a body of irradiated lead fluosilicate glass which has been irradiated by gamma rays or X-rays to thereby change the physical characteristics of the body.

The lead fluosilicate glass utilized in the present invention consists essentially of $XPbF_2 \cdot PbO \cdot SiO_2$ where in X ranges from 0.1 to 0.8 mole per mole of lead oxide and $SiO_2$ in a batch composition. The $SiO_2 \cdot PbO$ ratio may also be varied from a substantially unimolar ratio. According to the preferred embodiment of the invention the glass consists essentially of lead fluosilicate glass having the molar ratio of $0.5PbF_2PbO \cdot SiO_2$. Various glass modifiers may also be added to the glasses without departing from the scope of the invention.

The glass is produced by mixing the batch ingredients including lead oxides, lead fluoride and finely divided silica, and melting the mix at 900–1000° C. The melting temperatures vary with the fluorine content, so that, a lower temperature would be used with the higher fluorine content. The melt is stirred according to conventional techniques and the glass is cast on an iron plate which is at room temperature. The cast glass is then annealed at between 200 and 300° C. for about 12 hours. Subsequent to the annealing the glass is cooled to room temperature. The annealing temperature was also varied according to the fluorine content i.e. the higher annealing temperatures were used for those glasses having a lower fluorine content. Sodium, potassium and other glass modifiers may also be added to the compositions according to conventional glass making techniques.

The glass body may be shaped into a rod having a shape generally similar to the shape of a laser. The rodlike shape would be of either rectangular or circular cross section depending on the shape of the laser under consideration. The use of a shape body having dimensions which are the equivalent of the laser dimensions overcomes the need for making geometric interpretations or calculations when comparing the energy input into the dosimeter with the energy input into a laser.

As shown in the drawing, electromagnetic radiation from the energizing source is directed toward the laser position by a reflective housing. The geometry of the housing for a particular laser energizing system determines the amount of radiation reaching the laser position. By shaping a dosimeter material to correspond to the laser shape, a measure of the energy reaching the laser can be obtained. In highly efficient reflector housings, a large amount of radiation reaches the laser to stimulate emission, but in lower efficiency housings, a lesser amount of energy is directed to the laser position. Thus, by comparing the energy recorded by a laser-shaped dosimeter the efficiency of one laser system relative to another can be obtained. FIG. 1 shows an ellipsoidal reflector in which energy emitted from one elliptical focus is directed to a laser position at another focus. In FIG. 2, a typical laser energizing system is shown wherein radiation from a helical source is used to simulate emission in a laser rod concentrically positioned in a cylindrical reflector. Energy levels for stimulating emission in a particular laser material and laser shape may be compared for two diverse systems, such as represented by FIGS. 1 and 2 by measuring changes in spectral absorption in a standard irradiated dosimeter. The reversal of absorption properties is a measure of energizing radiation received by the laser rod in a particular housing.

The glass body is subjected to ionizing radiation by exposing the body of lead fluosilicate glass to X-ray or gamma rays. This irradiation has been accomplished by exposing the body to radiation in the range of .5 to 2.0 mev. to thereby produce color in the body. The aforementioned irradiation is preferably carried out at about one mev. by exposing the body to a cobalt 60 source of radiation.

In irradiating the glass it is imperative to limit the radiation to a gamma or X-ray source since an electron bombardment would produce reduced lead color centers as set forth in my copending application "Method for Changing the Physical Characteristics of an Article," filed concurrently herewith. These lead color centers are not reversible in response to the exposure to light.

The color produced in the glass body by gamma radiation is a red brown color as compared to the substantially colorless unexposed body. This color has a broad band extending into the visible and ultraviolet spectral range and produces its peak absorption near 460 millimicrons. This is particularly desirable for measuring the output of flash lamps. Accordingly it is particularly desirable for measuring the threshold level of a laser.

In order to measure the threshold level of a laser or the energy input for exciting a laser, the laser rod is removed from the device wherein it is energized and replaced by the irradiated fluosilicate glass body. The irradiated body is then subjected to the flux of light from the flash lamps which are utilized for exciting the laser. For example, an exposure from a 100 watt seconds flash lamp from a distance of approximately 1 inch produced a decrease in absorption or an increase in transmission. A dosimeter comprising irradiated lead fluosilicate glass which consists of ½$PbF_2 \cdot PbO \cdot SiO_2$ was exposed to a flash lamp. The flash lamp was energized by an input of 100 watt seconds and the resulting flash produced a 3.3% increase in the transmission of the dosimeter. A similar exposure with a 1000 watt second input produced a 31% increase in transmission.

Since the color is very stable in the dark at room temperature but fades relatively rapidly in light, the rods should be stored without being substantially exposed to visible light. The fading is responsive to small amounts of light and therefore the devices are useful for measuring relatively low intensities as well as those intensities required for laser operation.

While the exact nature of the color is not known, it appears that the color is related to the fluorine content. Accordingly the invention has been described with respect to ionized color centers.

What is claimed is:

1. A method for measuring electromagnetic radiation comprising the step of providing a body of lead fluosilicate glass, creating ionized color centers in the glass body by subjecting the body to electromagnetic ionizing radiation in the range of .5 to 2.0 mev. to thereby change the physical characteristics of the body, exposing the body to electromagnetic radiation comprising a spectral range from visible to ultra-violet rays, and measuring spectral absorption changes.

2. A method for measuring spectral radiation comprising the step of irradiating a lead fluosilicate glass body, with gamma rays or X-rays; to thereby produce color in the body, measuring spectral absorption in the colored body, exposing the body to a spectral radiation, and measuring the spectral absorption of the exposed body whereby the change in absorption is an indication of the intensity of spectral radiation.

3. A dosimeter comprising lead fluosilicate glass having stable spectral absorption properties after gamma irradiation.

4. A dosimeter according to claim 3 in which the composition of the lead fluosilicate glass consists essentially of $XPbF_2 \cdot PbO \cdot SiO_2$ by molar ratio wherein X ranges from 0.1 to 0.8.

5. A dosimeter according to claim 3 wherein the lead fluosilicate glass consists of $0.5PbF_2 \cdot PbO \cdot SiO_2$.

6. A dosimeter comprising a colored lead fluosilicate glass including ionized color centers as the colorant.

7. A dosimeter according to claim 5 in which the glass defines a rod-like shape.

8. A method for measuring laser excitation energy comprising irradiating a lead fluosilicate dosimeter material having a laser rod configuration with gamma or X-ray radiation to increase spectral absorption in the dosimeter material, placing the dosimeter material in a laser excitation device adapted to receive a laser rod shape, energizing a laser exciter means to emit spectral radiation in the visible to ultraviolet range, and measuring spectral absorption changes in the dosimeter.

9. The method of claim 8 wherein the dosimeter material comprises lead fluosilicate glass, and the gamma or X-ray radiation is in the range of 0.5 to 2 mev.

10. The method of claim 8 wherein the dosimeter material is a glass consisting essentially of $XPbF_2 \cdot PbO \cdot SiO_2$, in which X is about 0.1 to 0.8 and the molar ratio of PbO to $SiO_2$ is substantially unitary.

11. The method of claim 10 wherein X is about 0.5.

12. A method for measuring laser output energy comprising irradiating a lead fluosilicate dosimeter material with gamma or X-ray radiation to increase spectral absorption in the dosimeter material, irradiating the dosimeter material with spectral radiation from a laser and measuring spectral absorption changes in the dosimeter material.

13. The method of claim 12 wherein the dosimeter material comprises lead fluosilicate glass, and the gamma or X-ray radiation is in the range of 0.5 to 2 mev.

14. The method of claim 12 wherein the dosimeter material is a glass consisting essentially of $XPbF_2 \cdot PbO \cdot SiO_2$, in which X is about 0.1 to 0.8 and the molar ratio of PbO to $SiO_2$ is substantially unitary.

15. The method of claim 14 wherein X is about 0.5.

16. The dosimeter of claim 3 comprising lead fluosilicate glass irradiated with electromagnetic radiation in the range of 0.5 to 2 mev.

17. A glass composition consisting essentially of a lead fluosilicate having batch composition of $$XPbF_2 \cdot PbO \cdot SiO_2$$

in which X is about 0.1 to 0.8 and the molar ratio of PbO to $SiO_2$ is substantially unitary.

18. The composition of claim 17 comprising about 0.5 mole of $PbF_2$ in molar ratio.

19. A dosimetry method for measuring electromagnetic radiation comprising
  exposing lead fluosilicate material to gamma or X-ray radiation to produce a stable state having increased spectral absorption, and
  measuring spectral absorption in the material.

20. The method of claim 19 wherein the lead fluosilicate material consists essentially of glass having batch composition of $XPbF_2 \cdot PbO \cdot SiO_2$, in which X is about 0.1 to 0.8 and the molar ratio of PbO to $SiO_2$ is substantially unitary.

21. The method of claim 19 including exposing irradiated material to electromagnetic radiation comprising a spectral range from visible to ultraviolet rays, and measuring decreased spectral absorption in the irradiated material.

References Cited

UNITED STATES PATENTS

| | | | |
|---|---|---|---|
| 2,787,714 | 4/1957 | Schulman et al. | 250—83 |
| 2,935,613 | 5/1960 | Tirico | 250—83 |
| 3,115,415 | 12/1963 | Hoffman | 106—53 X |
| 3,152,215 | 10/1964 | Barstow et al. | 88—106 X |
| 3,264,476 | 8/1966 | Yokota et al. | 250—83 |

OTHER REFERENCES

Glass Dosimetry, by Davidson et al., from Nucleonics, vol. 14, No. 1, January 1956, pp. 34 to 39.

ARCHIE R. BORCHELT, *Primary Examiner.*